United States Patent [19]
Stanev

[11] Patent Number: 5,860,327
[45] Date of Patent: Jan. 19, 1999

[54] APPARATUS FOR TWO DIMENSIONAL ORIENTATION OF AN OBJECT

[76] Inventor: Stefan Stanev, 10731 Lawler St., Los Angeles, Calif. 90034

[21] Appl. No.: 872,354

[22] Filed: Jun. 10, 1997

[51] Int. Cl.[6] .................................................. F16M 11/12

[52] U.S. Cl. .......................... 74/490.05; 901/28; 248/371; 248/515

[58] Field of Search ................................. 901/23, 28, 29; 414/680; 74/490.05; 248/371, 515, 514, 276.1

[56] References Cited

U.S. PATENT DOCUMENTS

| | | | |
|---|---|---|---|
| 4,575,039 | 3/1986 | Persson et al. | 248/550 |
| 4,819,002 | 4/1989 | Reboullet | 343/765 |
| 5,142,932 | 9/1992 | Moya et al. | 74/490.05 |
| 5,573,218 | 11/1996 | Vaassen et al. | 248/371 |

FOREIGN PATENT DOCUMENTS

| | | | |
|---|---|---|---|
| 0133499 | 2/1985 | European Pat. Off. | 901/29 |
| 0153884 | 9/1985 | European Pat. Off. | 901/28 |
| 0155922 | 9/1985 | European Pat. Off. . | |
| 1222548 | 4/1986 | U.S.S.R. | 901/28 |

Primary Examiner—Rodney H. Bonck
Assistant Examiner—William C. Joyce
Attorney, Agent, or Firm—Beehler & Pavitt

[57] ABSTRACT

An apparatus for two dimensional orientation of an object, providing independent inclining and rotational capability while controlling undesired reactive motions is described. Applications for such a device occur in the fields of measuring and controlling instruments, machine tools, robotics, and various other disciplines requiring orienting mechanisms, for example the positioning of cameras, antennas, or telescopes. The apparatus can be constructed from five annular members, two annular gears, a series of mounting members, a constraining device, and two controllable motors for rotation of two of the annular members. The first, second, and fifth annular members include parallel upper and lower mounting planes. The third and fourth annular members each include an identical angle between their upper and lower mounting planes. The first annular member is mounted to a fixed surface with second through fifth annular members rotatably mounted on top of the first and succeeding members. Typically the rotatable mounting is achieved using devices such as ball or roller bearings. The object to be oriented is mounted to the upper mounting plane of the fifth annular member. By securing the fifth member to the second member with a constraining device, typically a flexible bellows, undesired rotation during inclining operations is eliminated. By linking the fourth and second members together using attached annular positioning means, undesired inclination during rotating operations is eliminated. Externally mounted control devices, typically electric motors connected to worm and ring gear mechanisms, allow the apparatus to rotate continuously without twisting of electrical cables or requiring complex sliding connections.

10 Claims, 4 Drawing Sheets

APPARATUS FOR TWO DIMENSIONAL ORIENTATION OF AN OBJECT

FIELD OF THE INVENTION

This invention relates to a device for providing independent inclining and rotational capability to a load while controlling undesired reactive motions. Applications for such a device occur in the fields of measuring and controlling instruments, machine tools, robotics, and various other disciplines requiring orienting mechanisms, for example the positioning of cameras, antennas, or telescopes.

BACKGROUND OF THE INVENTION

Description of the Prior Art

The desirability for controllably orienting an object in three dimensions, namely rotation about an axis and inclination with respect to that axis, and tilting of the axis itself, has long been recognized in various diverse fields of endeavor. These fields of endeavor include astronomy, antenna control, spacecraft attitude control, microscopy, photography, and construction of various flexible work platforms. Numerous United States and foreign patents have addressed the problems associated with control of an objects orientation. Noteworthy among the United States patents are U.S. Pat. No. 5,573,218, issued in 1996 and U.S. Pat. No. 4,819,002, issued in 1989.

The prior art devices have focused on providing orientation of an object in three dimensions, whereas the present invention addresses problems specifically related to orienting an object in two dimensions, namely rotation about an axis and inclination with respect to that axis. The problem with the prior art devices is that they have not met all of the desired features for a device which is optimized to control the orientation of an object in the above two dimensions. Principal among these features is the ability for the object to be rotated continuously about an axis. Prior art devices typically rotate the object by means of electric motors located within the rotating mounting structures. This limits rotation to the length and twisting capabilities of the electrical connections. The present invention locates all rotating and inclination actuators outside of the rotating mounting structures, thus permitting continuous rotation. Another desired feature not adequately addressed by the prior art is ability of the device to maintain an accurate rotational orientation while effecting a inclination of the object. Prior art devices achieve this type of control through complex feedback circuitry or similar means while the present invention solves this problem through simple mechanical linkage.

In addition, as most prior art devices provide three dimensional control for the orientation of an object, they are necessarily more complex, difficult and expensive to manufacture and more complex for the user to control. The present invention successfully addresses all of these issues while prior art devices have failed adequately to meet one or more of the above described desirable features.

SUMMARY OF THE INVENTION

In a first preferred embodiment of the invention an apparatus for two dimensional orientation of an object can be constructed from five annular members, two annular positioning means, a constraining means, and two controllable means for rotation of two of the annular members.

The first annular member defines a vertical reference axis and has a lower mounting plane adapted for mounting to a surface with the first member having an upper mounting plane substantially perpendicular to the vertical reference axis.

The second annular member is rotatably mounted with respect to the upper mounting plane of the first member and has upper and lower mounting planes substantially perpendicular to the vertical reference axis. An annular positioning means is fixedly attached to the upper mounting plane of the second member.

The third annular member is rotatably mounted with respect to the upper mounting plane of the second member and has a lower mounting plane substantially perpendicular to the vertical reference axis and an upper mounting plane inclined at a predetermined angle with respect to the lower mounting plane of the third member.

The fourth annular member is rotatably mounted with respect to the upper mounting plane of the third member and has a lower mounting plane and an upper mounting plane, which upper mounting plane is inclined at the predetermined angle with respect to the lower mounting plane of the fourth member. A mating annular positioning means is fixedly attached to the lower mounting plane of the fourth member positioned to engage the annular positioning means attached to the second member.

The fifth annular member is rotatably mounted with respect to the upper mounting plane of the fourth member and has a lower mounting plane and an upper mounting plane, which upper mounting plane is substantially parallel to the lower mounting plane and provides means for attachment of an object.

The constraining means is fixedly attached to the second member and the fifth member preventing relative rotation between the members.

The first controllable means causes the second member to rotate with respect to the first member and the second controllable means causes the third member to rotate with respect to the second member and the fourth member.

In a second preferred embodiment of the invention an apparatus for two dimensional orientation of an object can be constructed from five annular members, two annular positioning means, a series of mounting means, a constraining means, and two controllable means for rotation of two of the annular members.

The first annular member defines a vertical reference axis and has a lower mounting plane adapted for mounting to a surface and an upper mounting plane substantially perpendicular to the vertical reference axis.

The second rotatable annular member has an inner annular surface, and upper and lower mounting planes substantially perpendicular to the vertical reference axis. The second member includes an annular positioning means device fixedly attached to its upper mounting plane.

The first mounting means is located between the upper mounting plane of the first member and the lower mounting plane of the second member, which first mounting means includes means for permitting relative rotation between the first member and the second member.

The third rotatable annular member has a lower mounting plane substantially perpendicular to the vertical reference axis and an upper mounting plane inclined at a predetermined angle with respect to its lower mounting plane.

The second mounting means is located between the upper mounting plane of the second member and the lower mounting plane of the third member, which second mounting means includes means for permitting relative rotation between the second member and the third member.

The fourth rotatable annular member has a lower mounting plane and an upper mounting plane, which upper mounting plane is inclined at the predetermined angle with respect to the lower mounting plane of the fourth member. This predetermined angle should be the same predetermined angle found between the upper and lower mounting planes of the third member.

The second and mating annular positioning means is fixedly attached to the lower mounting plane of the fourth member and positioned to engage the annular positioning means attached to the second member.

The third mounting means is located between the upper mounting plane of the third member and the lower mounting plane of the fourth member, which third mounting means includes means for permitting relative rotation between the third member and the fourth member.

The fifth rotatable member has an inner annular surface, a lower mounting plane and an upper mounting plane, which upper mounting plane is substantially parallel to the lower mounting plane and provides means for attachment of an object.

The fourth mounting means is located between the upper mounting plane of the fourth member and the lower mounting plane of the fifth member, which fourth mounting means includes means for permitting relative rotation between the fourth member and the fifth member.

The constraining means is fixedly attached to the inner annular surface of the second member and the inner annular surface of the fifth member, thus preventing relative rotation therebetween.

The first controllable means causes the second member to rotate with respect to the first member, which first controllable means is positioned outside of the outer annular surface of the second member.

The second controllable means causes the third member to rotate with respect to the second member and the fourth member, which second controllable means is positioned outside of the outer annular surface of the third member.

Rotation of the object about the vertical reference axis is achieved by rotation of the second member and fifth member with respect to the first member with resulting compensating movement of the fourth member. Inclination of the object with respect to the vertical reference axis is achieved by rotation of the third member with respect to the second member and the fourth member. As the third member is so rotated, the upper mounting plane of the fourth member will incline with respect to the upper mounting plane of the second member.

Since the third and fourth members include the same angle with respect to their lower mounting planes, the maximum inclination between the lower mounting plane of the third member and the upper mounting plane of the fourth member is twice the included angle of the third or fourth member. When the third member is rotated 180 degrees from this maximum inclination position, the included angles of the third and fourth members will be complementary and the upper mounting plane of the fourth member will be essentially parallel to the lower mounting plane of the third member, resulting in essentially zero inclination of the object. A further 180 degree rotation of the third member with respect to member four will result in the minimization of the angle of inclination of the object.

To prevent unwanted rotation of the object mounted to the fifth member during inclination operations, the constraining member attached to the inner annular surface of the fifth member is attached to the inner annular surface of the second member. The constraining member is constructed to transmit substantially all twisting forces applied thereto.

To prevent unwanted inclination during rotation operations, the annular positioning means of the second member is engaged with the mating annular positioning means of the fourth member and the third member is essentially locked in position with respect to the first member and the surface to which it is attached by the second controlling means. As the second member is rotated the fifth member will rotate with it. During this rotation the mating bevel gears will cause the fourth member to rotate in the opposite direction of the second member. This counter rotation of the fourth member will cause the inclination imparted to the object by movement of the second member (and hence the fifth member due to their linkage) with respect to the third member, to be counteracted by the movement of the fourth member with respect to the third member. Thus the angle of inclination of the object remains constant as the object is rotated.

In a variant of the preferred embodiment the first controllable means further comprises a first annular ring gear fixedly mounted to the outer annular surface of the second member; a first motor or other rotating device fixedly mounted to the surface to which the first member is attached; a first worm or pinon gear mounted to a first controllably rotatable shaft of the first motor or rotating device engaging the first annular ring gear; and a first means for controlling the rotation of the first shaft.

In another variant of the preferred embodiment the second controllable means further comprises a second annular ring gear fixedly mounted to the outer annular surface of the third member; a second motor or other rotating device fixedly mounted to the surface to which the first member is attached; a second worm or pinon gear mounted to a second controllably rotatable shaft of the second motor or rotating device engaging the second annular ring gear of the third member; a second means for controlling the rotation of the second shaft.

In yet another variant of the preferred embodiment the annular positioning means and mating annular positioning means are an annular bevel gear and a mating annular bevel gear, respectively.

It is preferred that the invention also include a sensing means connected to the first member and the second member for measuring the relative rotation between the members.

It is also preferred that the invention include a sensing means connected to the second member and the fifth member for measuring the relative angle of inclination between these members.

It is also preferred that the first, second, third, and fourth mounting means includes a plurality of bearings.

In another variant of the preferred embodiment the constraining means comprises a flexible bellows.

It is also preferred that the attachment means of the fifth member comprises a series of holes and slots size to accept a variety of mounting hardware.

DESCRIPTION OF THE PREFERRED EMBODIMENT

Figure 1:
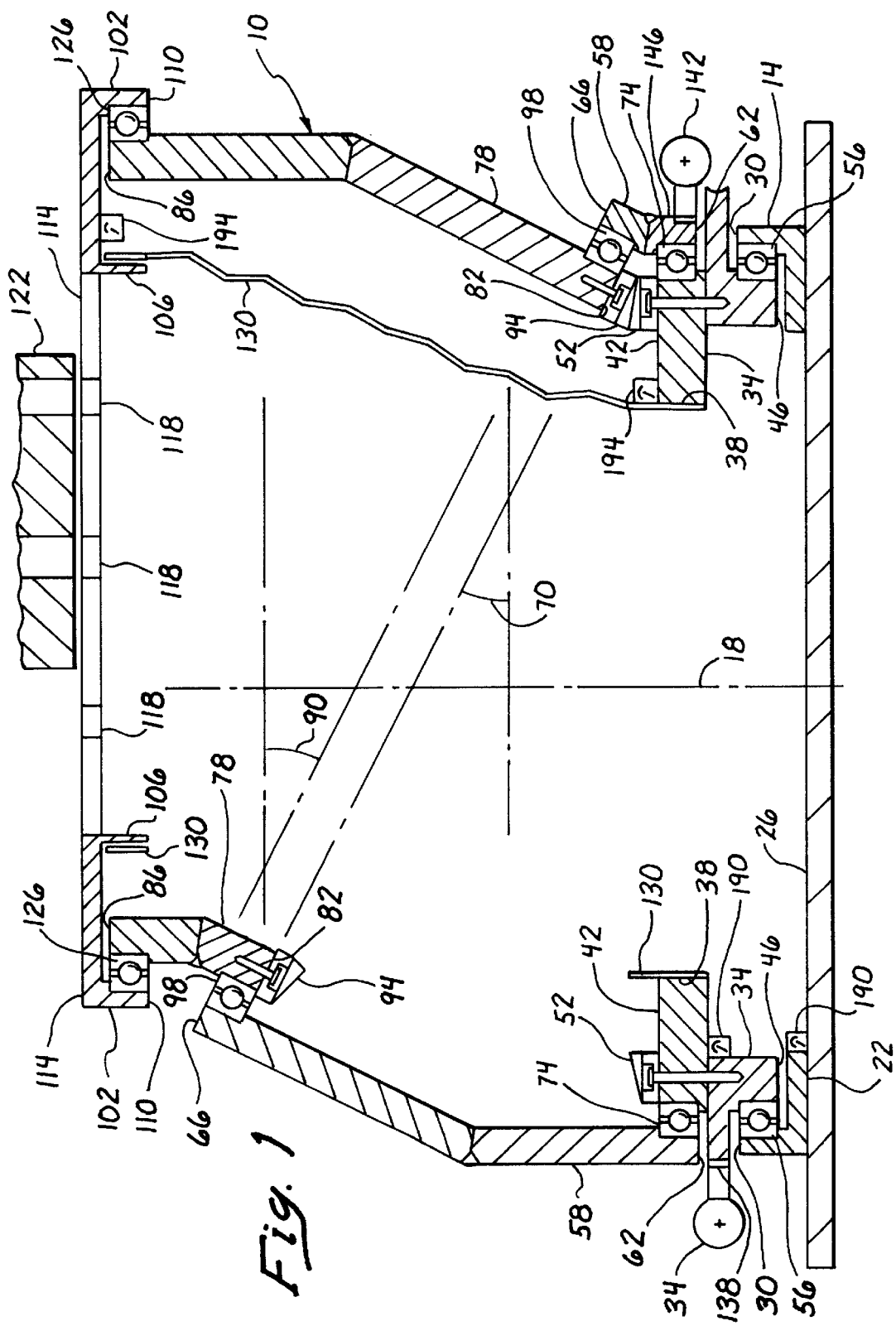
FIG. 1 is side cross-sectional view of the preferred embodiment of the present invention.

FIG. 1 illustrates the first preferred embodiment of the invention, an apparatus for two dimensional orientation of an object 10. The apparatus can be constructed from five annular members, two annular gears, a series of mounting means, a constraining means, and two controllable means for rotation of two of the annular members.

The first annular member 14 defines a vertical reference axis 18 and has a lower mounting plane 22 adapted for mounting to a surface 26 and an upper mounting plane 30 substantially perpendicular to the vertical reference axis 18.

The second rotatable annular member 34 has an inner annular surface 38, and upper 42 and lower 46 mounting planes substantially perpendicular to the vertical reference axis 18. The second member includes an annular bevel gear 52 or similar positioning device fixedly attached to its upper mounting plane 42.

The first mounting means 56 is located between the upper mounting plane 30 of the first member 14 and the lower mounting plane 46 of the second member 34, which first mounting means 56 includes means for permitting relative rotation between the first member 14 and the second member 34.

The third rotatable annular member 58 has a lower mounting plane 62 substantially perpendicular to the vertical reference axis 18 and an upper mounting plane 66 inclined at a predetermined angle 70 with respect to its lower mounting plane 62.

The second mounting means 74 is located between the upper mounting plane 42 of the second member 34 and the lower mounting plane 62 of the third member 58, which second mounting means 74 includes means for permitting relative rotation between the second member 34 and the third member 58.

The fourth rotatable annular member 78 has a lower mounting plane 82 and an upper mounting plane 86, which upper mounting plane 86 is inclined at the predetermined angle 90 with respect to the lower mounting plane 82 of the fourth member 78. This predetermined angle 90 is the same predetermined angle 70 found between the upper mounting plane 66 and the lower mounting plane 62 of the third member 58.

The second and mating annular bevel gear 94 or similar positioning device is fixedly attached to the lower mounting plane 82 of the fourth member 78 and positioned to engage the annular bevel gear 52 attached to the second member 34.

The third mounting means 98 is located between the upper mounting plane 66 of the third member 58 and the lower mounting plane 82 of the fourth member 78, which third mounting means 98 includes means for permitting relative rotation between the third member 58 and the fourth member 78.

The fifth rotatable member 102 has an inner annular surface 106, a lower mounting plane 110 and an upper mounting plane 114, which upper mounting plane 114 is substantially parallel to the lower mounting plane 106 and provides means 118 for attachment of an object 122.

The fourth mounting means 126 is located between the upper mounting plane 86 of the fourth member 78 and the lower mounting plane 110 of the fifth member 102, which fourth mounting means 126 includes means for permitting relative rotation between the fourth member 78 and the fifth member 102.

The constraining means 130 (partially shown) is fixedly attached to the inner annular surface 38 of the second member 34 and the inner annular surface 106 of the fifth member 102 preventing relative rotation therebetween.

The first controllable means 134 causes the second member 34 to rotate with respect to the first member 14, which first controllable means 134 is positioned outside of the outer annular surface 138 of the second member 34.

The second controllable means 142 causes the third member 58 to rotate with respect to the second member 34 and the fourth member 78, which second controllable means 142 is positioned outside of the outer annular surface 146 of the third member 58.

Rotation of the object 122 about the vertical reference axis 18 is achieved by rotation of the second member 34 and fifth member 102 with respect to the first member 14 with resulting compensating movement of the fourth member 78.

A variant of the preferred embodiment of the invention 10 further comprises a first sensing means 190 connected to the first member 14 and the second member 34 for measuring the relative rotation therebetween.

Figure 2:
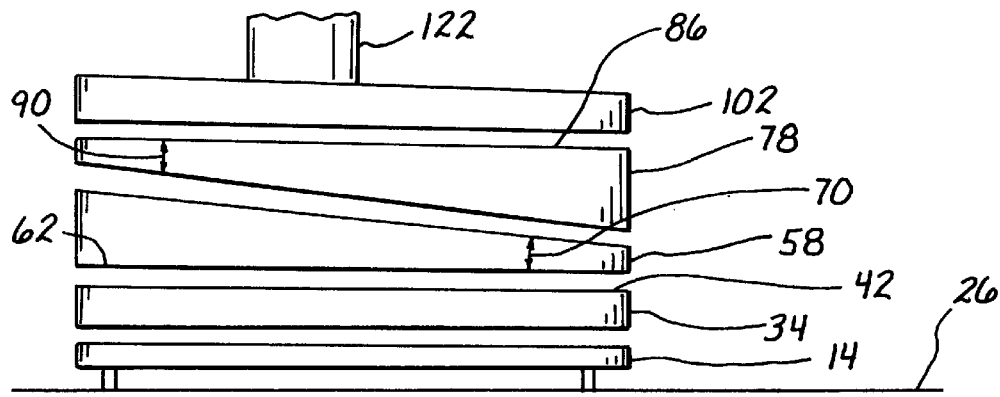
FIG. 2 is an illustrative diagram of the embodiment of FIG. 1 depicting zero inclination of an object mounted to the device.
Figure 3:
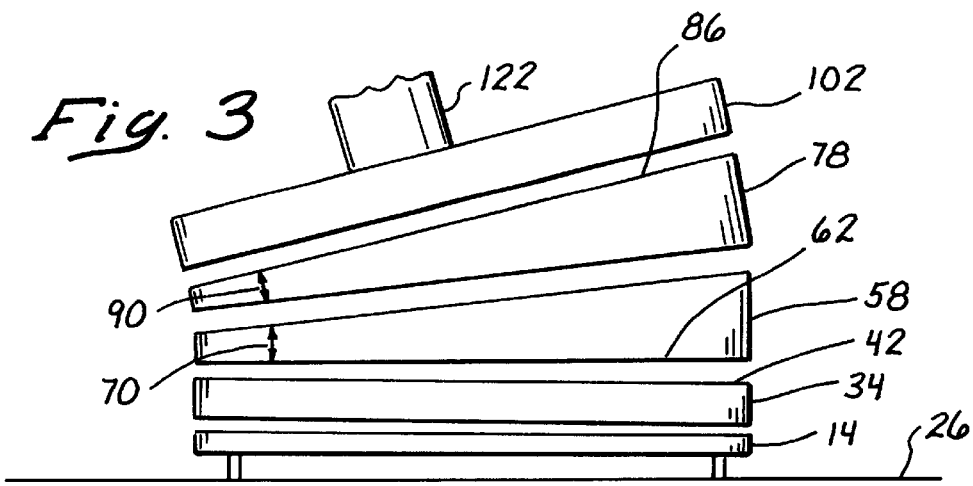
FIG. 3 is an illustrative diagram of the embodiment of FIG. 1 depicting maximum forward inclination of an object mounted to the device.
Figure 4:
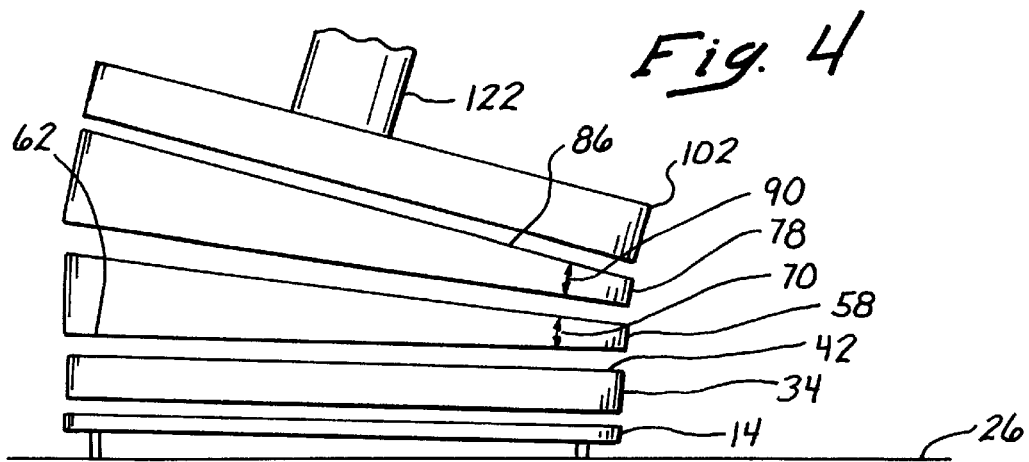
FIG. 4 is an illustrative diagram of the embodiment of FIG. 1 depicting maximum rearward (minimum forward) inclination of an object mounted to the device.

Another variant of the preferred embodiment of the invention further comprises a second sensing means 194 connected to the second member 34 and the fifth member 102 for measuring the relative angle of inclination therebetween FIGS. 2, 3, and 4 illustrate inclination of the object 122 with respect to the vertical reference axis 18. This inclination is achieved by rotation of the third member 58 with respect to the second member 34 and the fourth member 78. As the third member 58 is so rotated, the upper mounting plane 86 of the fourth member 78 will incline with respect to the upper mounting plane 42 of the second member 34.

Since the third member 58 and the fourth member 78 include the same angle 70 or 90 with respect to their lower mounting planes, the maximum inclination between the lower mounting plane 62 of the third member 58 and the upper mounting plane 86 of the fourth member 78 is twice the included angle 70 of the third or member 58 or the included angle 90 of the fourth member 78. When the third member 58 is rotated 180 degrees from this maximum inclination position (FIG. 3), the included angles of the third 58 and fourth 78 members will be complementary and the upper mounting plane 86 of the fourth member 78 will be essentially parallel to the lower mounting plane 62 of the third member 58, resulting in essentially zero inclination of the object 122 (FIG. 2). A further 180 degree rotation of the third member 58 with respect to member four 78 will result in the minimization of the angle of inclination of the object (FIG. 4).

Figure 5:
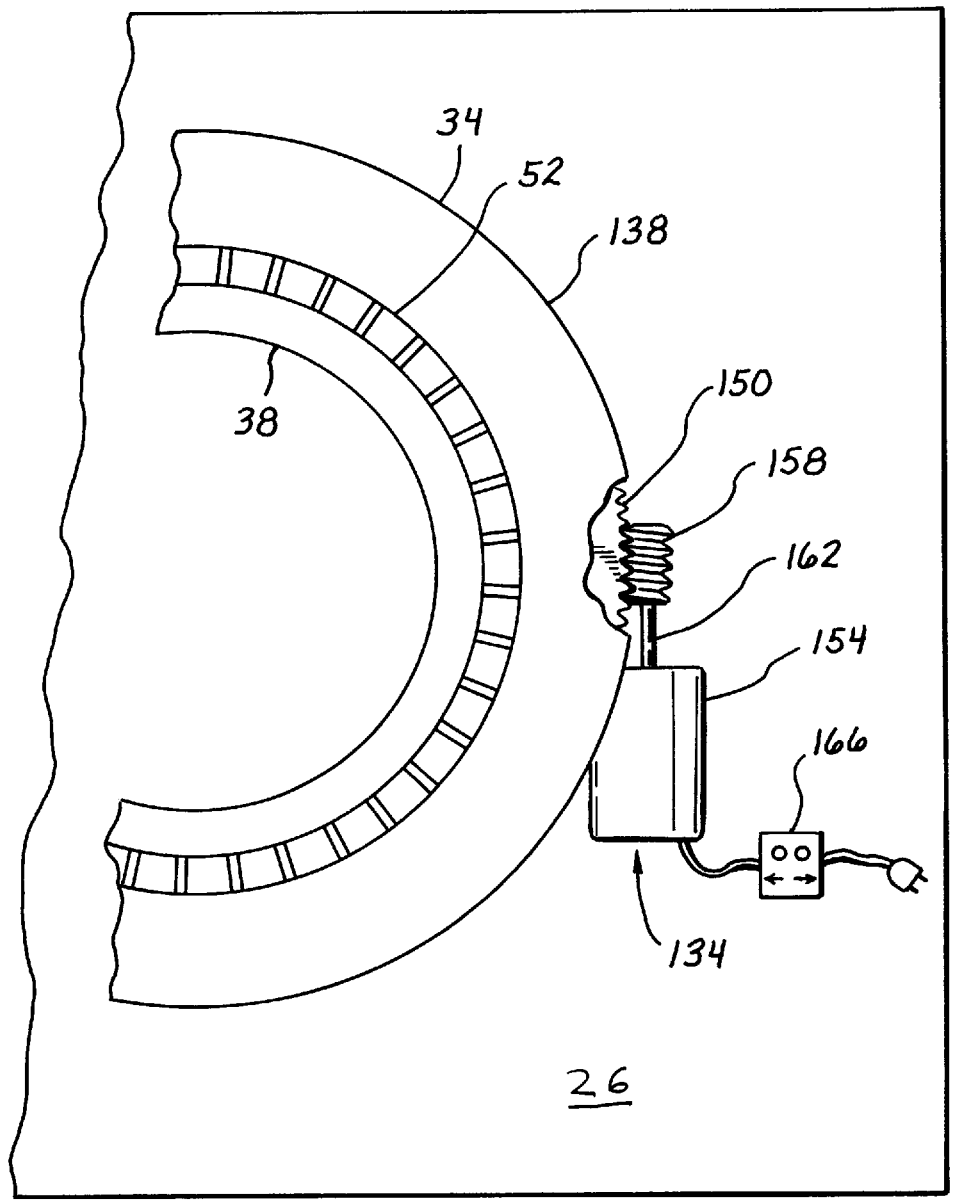
FIG. 5 is a partial plan view of a detail of the FIG. 1 embodiment depicting the second member and attached annular bevel gear, attached annular ring gear, worm gear, drive motor, and controlling means.

FIG. 5 illustrates a variant of the preferred embodiment 10 in which the first controllable means 134 further comprises a first annular ring gear 150 fixedly mounted to the outer annular surface 138 of the second member 34; a first motor 154 or other rotating device fixedly mounted to the surface 26 to which the first member 14 is attached (FIG. 1); a first worm 158 or pinon gear mounted to a first controllably rotatable shaft 162 of the first motor 154 or rotating device engaging the first annular ring gear 150; and a first means 166 for controlling the rotation of the first shaft 162.

Figure 6:
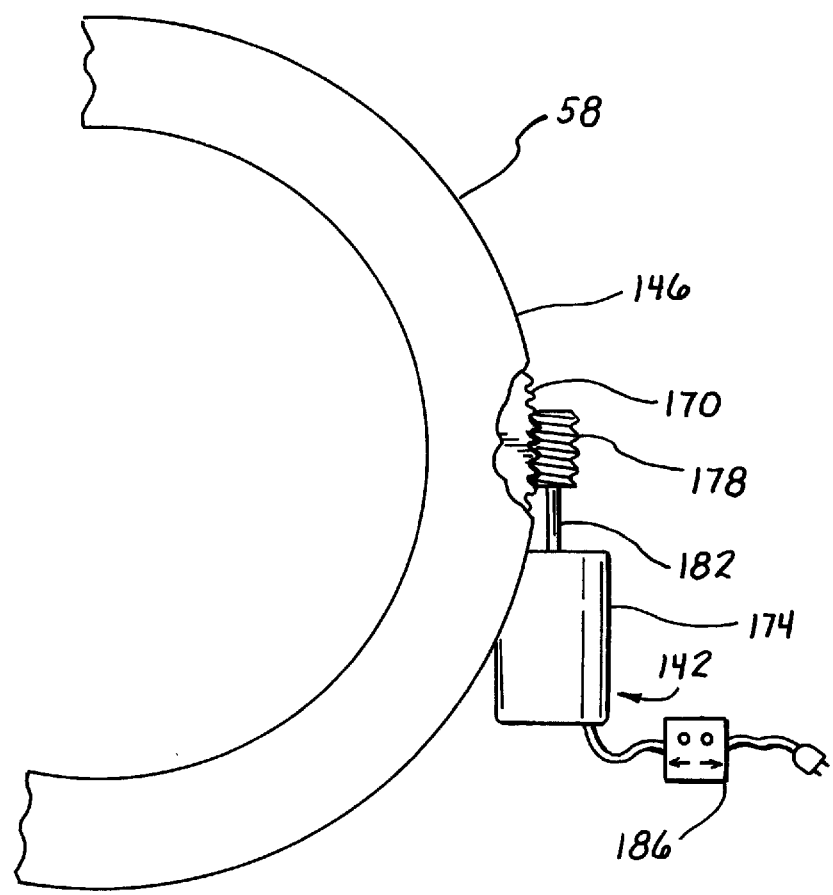
FIG. 6 is a partial plan view of a detail of the FIG. 1 embodiment depicting the third member, attached annular ring gear, worm gear, drive motor, and controlling means.

FIG. 6 illustrates another variant of the preferred embodiment 10 in which the second controllable means 142 further comprises a second annular ring gear 170 fixedly mounted to the outer annular surface 146 of the third member 58; a second motor 174 or other rotating device fixedly mounted to the surface 26 to which the first member 14 (FIG. 1) is attached; a second worm 178 or pinon gear mounted to a second controllably rotatable shaft 182 of the second motor 174 or rotating device engaging the second annular ring gear 170 of the third member 58; and a second means 186 for controlling the rotation of the second shaft 182.

In operation, the first controllable means 134 is activated to cause the second member 34 and linked fifth member 102 to rotate with respect to the first member 14 mounted to surface 26, thus causing object 122 to rotate. When third member 58 is locked in a fixed position by second controllable means 142 and second member 34 is rotated, first annular bevel gear 52 causes fourth member 78 to rotate opposite the second member 34 by virtue of second and mating annular bevel gear 94 attached to the fourth member 78. The relative rotation between fixed third member 58 and fourth member 78 causes the inclination of upper mounting plane 86 of the fourth member 78 to remain constant during any rotation of the second member 34, fifth member 102, and object 122.

Likewise, activation of the second controllable means 142 causes the third member 58 to rotate with respect to fourth member 78, thus changing the included angle between the lower mounting plane 62 of the third member 58 and the upper mounting plane 86 of the fourth member 78, thus causing fifth member 102 and attached object 122 to incline with respect to the vertical reference axis 18. During this inclining operation, second member 34 is stationary with respect to first member 14 and fifth member 102 is prevented from rotating by constraining means 130 linking second member 34 and fifth member 102. Thus no undesired rotation of object 122 will result from activation of second controllable means 142 to effect inclination of object 122.

The foregoing detailed disclosure is intended as merely exemplary, and not to limit the scope of the invention—which scope is to be determined by reference to the appended claims.

I claim:

1. An apparatus for two dimensional orientation of an object comprising:

a first annular member defining a vertical reference axis;

said first member having a lower mounting plane adapted for mounting to a surface;

said first member having an upper mounting plane substantially perpendicular to the vertical reference axis;

a second annular member rotatably mounted with respect to said upper mounting plane of said first member, having upper and lower mounting planes substantially perpendicular to the vertical reference axis;

an annular positioning means fixedly attached to the upper mounting plane of the second member;

a third annular member rotatably mounted with respect to said upper mounting plane of said second member, having a lower mounting plane substantially perpendicular to the vertical reference axis and an upper mounting plane inclined at a predetermined angle with respect to the lower mounting plane of the third member;

a fourth annular member rotatably mounted with respect to said upper mounting plane of said third member, having a lower mounting plane and an upper mounting plane, which upper mounting plane is inclined at the predetermined angle with respect to the lower mounting plane of the fourth member;

a mating annular positioning means fixedly attached to the lower mounting plane of the fourth member positioned to engage the annular positioning means attached to the second member;

a fifth member rotatably mounted with respect to said upper mounting plane of said fourth member, having a lower mounting plane and an upper mounting plane, which upper mounting plane is substantially parallel to the lower mounting plane of the fifth member, and provides means for attachment of an object;

a constraining means fixedly attached to the second member and the fifth member preventing relative rotation therebetween;

a first controllable means for causing the second member to rotate with respect to the first member;

a second controllable means for causing the third member to rotate with respect to the second member and the fourth member.

2. An apparatus for two dimensional orientation of an object comprising:

a first annular member defining a vertical reference axis;

said first member having a lower mounting plane adapted for mounting to a surface;

said first member having an upper mounting plane substantially perpendicular to the vertical reference axis;

a second rotatable annular member having an inner annular surface, and upper and lower mounting planes substantially perpendicular to the vertical reference axis;

an annular positioning means fixedly attached to the upper mounting plane of the second member;

a first mounting means located between the upper mounting plane of the first member and the lower mounting plane of the second member, which first mounting means includes means for permitting relative rotation between the first member and the second member;

a third rotatable annular member having a lower mounting plane substantially perpendicular to the vertical reference axis and an upper mounting plane inclined at a predetermined angle with respect to the lower mounting plane of the third member;

a second mounting means located between the upper mounting plane of the second member and the lower mounting plane of the third member, which second mounting means includes means for permitting relative rotation between the second member and the third member;

a fourth rotatable annular member having a lower mounting plane and an upper mounting plane, which upper mounting plane is inclined at the predetermined angle with respect to the lower mounting plane of the fourth member;

a mating annular positioning means fixedly attached to the lower mounting plane of the fourth member positioned to engage the annular positioning means attached to the second member;

a third mounting means located between the upper mounting plane of the third member and the lower mounting plane of the fourth member, which third mounting means includes means for permitting relative rotation between the third member and the; fourth member;

a fifth rotatable member having an inner annular surface, a lower mounting plane and an upper mounting plane, which upper mounting plane is substantially parallel to the lower mounting plane of the fifth member and provides means for attachment of an object;

a fourth mounting means located between the upper mounting plane of the fourth member and the lower mounting plane of the fifth member, which fourth mounting means includes means for permitting relative rotation between the fourth member and the fifth member;

a constraining means fixedly attached to the inner annular surface of the second member and the inner annular surface of the fifth member preventing relative rotation therebetween;

a first controllable means for causing the second member to rotate with respect to the first member, which first controllable means is positioned outside of an outer annular surface of the second member;

a second controllable means for causing the third member to rotate with respect to the second member and the fourth member, which second controllable means is positioned outside of an outer annular surface of the third member.

3. The controllable means of claim 1 or claim 2, further comprising:

a first annular ring gear fixedly mounted to the outer annular surface of the second member;

a first rotating device fixedly mounted to the surface to which the first member is attached;

a first worm or pinon gear mounted to a first controllably rotatable shaft of the first rotating device engaging the first annular ring gear; and a first means for controlling the rotation of the first shaft.

4. The controllable means of claim 1 or claim 2, further comprising:

a second annular ring gear fixedly mounted to the outer annular surface of the third member;

a second rotating device fixedly mounted to the surface to which the first member is attached;

a second worm or pinon gear mounted to a second controllably rotatable shaft of the second rotating device engaging the second annular ring gear of the third member; and a second means for controlling the rotation of the second shaft.

5. The apparatus for two dimensional orientation of an object of claim 1 or claim, wherein the annular positioning means and mating annular positioning means are an annular bevel gear and a mating annular bevel gear, respectively.

6. The apparatus for two dimensional orientation of an object of claim 1 or claim 2 further comprising:

a sensing means connected to the first member and the second member for measuring the relative rotation therebetween.

7. The apparatus for two dimensional orientation of an object of claim 1 or claim 2 further comprising:

a sensing means connected to the second member and the fifth member for measuring the relative angle of inclination therebetween.

8. The apparatus for two dimensional orientation of an object of claim 2, wherein the first, second, third, and fourth mounting means includes a plurality of bearings.

9. The apparatus for two dimensional orientation of an object of claim 1 or claim 2, wherein the constraining means comprises a flexible bellows.

10. The apparatus for two dimensional orientation of an object of claim 1 or claim 2, wherein the attachment means of the fifth member comprises a series of holes and slots size to accept a variety of mounting hardware.

* * * * *